(12) United States Patent
Kumashio

(10) Patent No.: US 9,753,888 B2
(45) Date of Patent: Sep. 5, 2017

(54) INFORMATION PROCESSING DEVICE AND CONFERENCE SYSTEM

(71) Applicant: Hiroya Kumashio, Chiba (JP)

(72) Inventor: Hiroya Kumashio, Chiba (JP)

(73) Assignee: Ricoh Company, Ltd., Tokyo (JP)

( * ) Notice: Subject to any disclaimer, the term of this patent is extended or adjusted under 35 U.S.C. 154(b) by 511 days.

(21) Appl. No.: 14/011,983

(22) Filed: Aug. 28, 2013

(65) Prior Publication Data

US 2014/0074930 A1    Mar. 13, 2014

(30) Foreign Application Priority Data

Sep. 13, 2012 (JP) ................................ 2012-201145
May 15, 2013 (JP) ................................ 2013-103037

(51) Int. Cl.
*G06F 15/16* (2006.01)
*G06F 15/173* (2006.01)
*H04L 12/18* (2006.01)

(52) U.S. Cl.
CPC .... *G06F 15/17306* (2013.01); *H04L 12/1822* (2013.01)

(58) Field of Classification Search
CPC ........... G06F 15/17306; H04L 12/1822; H04L 67/02; H04L 67/34; H04L 12/1813; H04M 3/567; H04N 7/152; H04N 21/6125
USPC ..... 709/204, 227, 224; 715/255, 753; 726/3, 726/4, 7
See application file for complete search history.

(56) References Cited

U.S. PATENT DOCUMENTS

| 5,497,494 A | 3/1996 | Combs et al. |
| 5,996,003 A * | 11/1999 | Namikata ................ H04N 7/15 |
| | | 348/E7.081 |
| 7,631,049 B2 | 12/2009 | Tanimoto |
| 2004/0066968 A1 * | 4/2004 | Glickman .............. H04N 1/646 |
| | | 382/166 |

(Continued)

FOREIGN PATENT DOCUMENTS

| CN | 1184577 | 6/1998 |
| CN | 101662496 | 3/2010 |

(Continued)

OTHER PUBLICATIONS

Extended European search report dated Dec. 13, 2013.

(Continued)

*Primary Examiner* — Thuong Nguyen
(74) *Attorney, Agent, or Firm* — IPUSA, PLLC

(57) ABSTRACT

An information processing device includes a receiving unit configured to receive a request to acquire a content to be shared among a plurality of client terminals attending a conference, from at least one of the plurality of client terminals; a determining unit configured to use first information to determine whether the content is allowed to be provided in response to the request from the at least one of the plurality of client terminals, the first information being used for attending the conference during the conference and used for acquiring the content at times other than during the conference when the content is allowed to be provided; and a providing unit configured to provide the content to the at least one of the plurality of client terminals which is a source of the request, when a result of the determination is that the content is allowed to be provided.

7 Claims, 13 Drawing Sheets

| ITEM NAME | DESCRIPTION |
|---|---|
| CONFERENCE ID | ID FOR UNIQUELY IDENTIFYING CONFERENCE, SET BY CONFERENCE SERVER WHEN CREATING CONFERENCE |
| CONFERENCE NAME | NAME USED BY USER FOR IDENTIFYING CONFERENCE |
| CONFERENCE DATE | SCHEDULED TIME OF STARTING CONFERENCE |
| PASSWORD | WHEN THIS VALUE IS SET, THIS PASSWORD NEEDS TO BE INPUT WHEN HOLDING A CONFERENCE AND ATTENDING A CONFERENCE BEING HELD<br>FURTHERMORE, PASSWORD NEEDS TO BE INPUT WHEN DOWNLOADING CONFERENCE MATERIAL |
| AUTHORIZATION FOR DOWNLOADING CONFERENCE MATERIAL | FLAG INDICATING WHETHER USER IS AUTHORIZED TO DOWNLOAD CONFERENCE MATERIAL AFTER CONFERENCE (TRUE/FALSE) |
| AUTHORIZATION FOR CHANGING PRESENTER | FLAG INDICATING WHETHER PRESENTER CAN BE CHANGED DURING CONFERENCE (TRUE/FALSE) |
| CONFERENCE STATUS | VALUE INDICATING ANY ONE OF THREE STATUSES OF BEFORE CONFERENCE, DURING CONFERENCE, AND AFTER CONFERENCE, IS SET CHANGED BY CONFERENCE SERVER ACCORDING TO STATUS |
| CONFERENCE MATERIAL | BINARY DATA OF CONFERENCE MATERIAL |

(56) References Cited

U.S. PATENT DOCUMENTS

| | | | |
|---|---|---|---|
| 2005/0086344 A1* | 4/2005 | Suesserman | H04L 67/02 709/227 |
| 2006/0053042 A1* | 3/2006 | Yoshimura | G06Q 10/02 705/7.25 |
| 2006/0264239 A1* | 11/2006 | Tominaga | G06F 17/30194 455/558 |
| 2007/0150583 A1* | 6/2007 | Asthana | G06Q 10/06 709/224 |
| 2007/0180029 A1* | 8/2007 | Croak | H04M 3/567 709/204 |
| 2007/0239825 A1* | 10/2007 | Walter | H04N 7/152 709/204 |
| 2008/0055627 A1* | 3/2008 | Ellis | G06F 21/608 358/1.14 |
| 2008/0263648 A1 | 10/2008 | Sathyan et al. | |
| 2009/0019526 A1* | 1/2009 | Fukushima | H04L 12/1822 726/3 |
| 2009/0177743 A1* | 7/2009 | Ashour | H04L 12/1831 709/204 |
| 2010/0049579 A1 | 2/2010 | Suzuki | |
| 2011/0055329 A1* | 3/2011 | Abt, Jr. | G06F 17/3089 709/205 |
| 2012/0089928 A1* | 4/2012 | Bryant | G06Q 10/10 715/753 |
| 2012/0110196 A1* | 5/2012 | Balasaygun | H04L 12/1818 709/228 |
| 2012/0284618 A1* | 11/2012 | Bailor | G06Q 10/101 715/255 |
| 2013/0007635 A1* | 1/2013 | Michaelis | H04M 3/56 715/753 |
| 2013/0145284 A1* | 6/2013 | Anantharaman | H04L 12/1822 715/753 |
| 2014/0033067 A1* | 1/2014 | Pittenger | G06F 21/606 715/751 |
| 2014/0074930 A1* | 3/2014 | Kumashio | G06F 15/17306 709/204 |

FOREIGN PATENT DOCUMENTS

| | | |
|---|---|---|
| CN | 102215238 | 10/2011 |
| EP | 1 980 949 A1 | 10/2008 |
| JP | 08-202659 | 8/1996 |
| JP | 2002-041461 | 2/2002 |
| JP | 2004-240577 | 8/2004 |
| JP | 2004-334721 | 11/2004 |
| JP | 2005-284344 | 10/2005 |
| JP | 2006-146415 | 6/2006 |
| JP | 2007-164726 | 6/2007 |
| JP | 2009-175842 | 8/2009 |
| JP | 2009-205319 | 9/2009 |
| JP | 2010-049456 | 3/2010 |
| JP | 2011-113371 | 6/2011 |
| JP | 2011-182051 | 9/2011 |
| JP | 2012-123736 | 6/2012 |
| WO | 2011/032393 | 3/2011 |

OTHER PUBLICATIONS

U.S. Appl. No. 13/905,288, filed May 30, 2013.
Chinese Office Action dated Apr. 28, 2016.
Japanese Office Action for 2013-103037 dated Apr. 25, 2017.

* cited by examiner

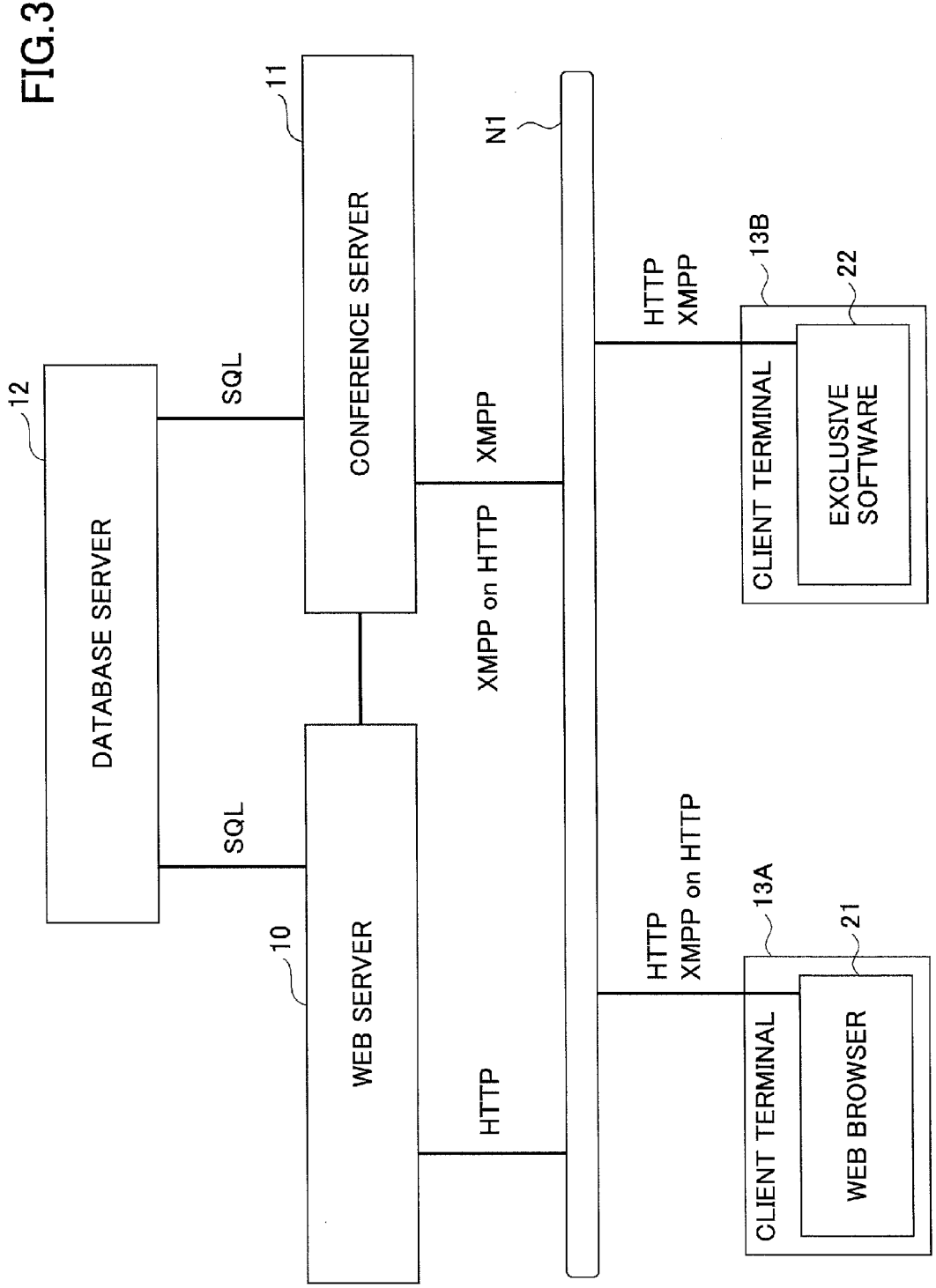

FIG.4

| ITEM NAME | DESCRIPTION |
|---|---|
| CONFERENCE ID | ID FOR UNIQUELY IDENTIFYING CONFERENCE, SET BY CONFERENCE SERVER WHEN CREATING CONFERENCE |
| CONFERENCE NAME | NAME USED BY USER FOR IDENTIFYING CONFERENCE |
| CONFERENCE DATE | SCHEDULED TIME OF STARTING CONFERENCE |
| PASSWORD | WHEN THIS VALUE IS SET, THIS PASSWORD NEEDS TO BE INPUT WHEN HOLDING A CONFERENCE AND ATTENDING A CONFERENCE BEING HELD<br>FURTHERMORE, PASSWORD NEEDS TO BE INPUT WHEN DOWNLOADING CONFERENCE MATERIAL |
| AUTHORIZATION FOR DOWNLOADING CONFERENCE MATERIAL | FLAG INDICATING WHETHER USER IS AUTHORIZED TO DOWNLOAD CONFERENCE MATERIAL AFTER CONFERENCE (TRUE/FALSE) |
| AUTHORIZATION FOR CHANGING PRESENTER | FLAG INDICATING WHETHER PRESENTER CAN BE CHANGED DURING CONFERENCE (TRUE/FALSE) |
| CONFERENCE STATUS | VALUE INDICATING ANY ONE OF THREE STATUSES OF BEFORE CONFERENCE, DURING CONFERENCE, AND AFTER CONFERENCE, IS SET CHANGED BY CONFERENCE SERVER ACCORDING TO STATUS |
| CONFERENCE MATERIAL | BINARY DATA OF CONFERENCE MATERIAL |

FIG.5

| INSTRUCTION | DESCRIPTION |
|---|---|
| CREATE CONFERENCE | [REQUEST MESSAGE]<br>`<iq id="ID" to="DOMAIN" type="set">`<br>　`<createnewconference>`<br>　　`<conference_name>`CONFERENCE NAME`</conference_name>`<br>　　`<startdate>`CONFERENCE DATE`</startdate>`<br>　　`<pwd>`PASSWORD`</pwd>`<br>　　`<removalflag>`AUTHORIZATION FOR DOWNLOADING CONFERENCE MATERIAL`</removalflag>`<br>　　`<presenter_lock>`AUTHORIZATION FOR CHANGING PRESENTER`</presenter_lock>`<br>　`</createnewconference>`<br>`</iq>`<br><br>[DESCRIPTION]<br>FOR EACH PASSWORD, WHEN THERE IS NO ITEM, IT MEANS THERE IS NO PASSWORD. |
| | [RESPONSE MESSAGE]<br>`<iq type="result" id="ID" from="DOMAIN" to="USER JID"/>`<br>　`<createnewconference>`<br>　　`<conference_id>`CONFERENCE ID`</conference_id>`<br>　`</createnewconference>`<br>`</iq>`<br><br>[DESCRIPTION]<br>CREATED CONFERENCE ID IS RETURNED. |
| EDIT CONFERENCE | [REQUEST MESSAGE]<br>`<iq id="ID" to="DOMAIN" type="set">`<br>　`<savechangeconferencedata>`<br>　　`<conference_id>`CONFERENCE ID`</conference_id>`<br>　　`<conference_name>`CONFERENCE NAME`</conference_name>`<br>　　`<startdate>`CONFERENCE DATE`</startdate>`<br>　　`<pwd>`PASSWORD`</pwd>`<br>　　`<removalflag>`AUTHORIZATION FOR DOWNLOADING CONFERENCE MATERIAL`</removalflag>`<br>　　`<presenter_lock>`AUTHORIZATION FOR CHANGING PRESENTER`</presenter_lock>`<br>　`</savechangeconferencedata>`<br>`</iq>`<br><br>[DESCRIPTION]<br>SPECIFY CONFERENCE ID OF CHANGE OBJECT. ONLY EXISTING ITEMS ARE CHANGE OBJECTS. |
| | [RESPONSE MESSAGE]<br>`<iq type="result" id="ID" from="DOMAIN" to="USER JID"/>`<br>　`<savechangeconferencedata/>`<br>`</iq>` |
| DELETE CONFERENCE | [REQUEST MESSAGE]<br>`<iq id="ID" to="DOMAIN" type="set">`<br>　`<deleteconference>`<br>　　CONFERENCE ID<br>　`</deleteconference>`<br>`</iq>` |
| | [RESPONSE MESSAGE]<br>`<iq type="result" id="ID" from="DOMAIN" to="USER JID"/>`<br>　`<deleteconference />`<br>`</iq>` |

FIG.6

| INSTRUCTION | DESCRIPTION |
|---|---|
| SEARCH CONFERENCE INFORMATION | [REQUEST MESSAGE]<br>    <iq id="ID" to="DOMAIN" type="get"><br>        <getconferencelist><br>           <searchcondition><br>              <day>CONFERENCE DATE</day><br>              <status>STATUS</status><br>              <keyword>KEYWORD</keyword><br>              <conference_id>CONFERENCE ID</conference_id><br>           </searchcondition><br>        </getconferencelist><br>    </iq><br><br>[DESCRIPTION]<br>REFINE SEARCH OBJECT BY searchcondition<br>・CONFERENCE DATE: REFINE BY CONFERENCE DATE<br>・STATUS: REFINE BY CONFERENCE STATUS, OR SEARCH CAN BE PERFORMED BY SEPARATING BY HALF SIZE SPACE<br>・KEYWORD: REFINE BY KEYWORD. SEARCH OBJECTS ARE CONFERENCE ID AND CONFERENCE NAME, OR SEARCH CAN BE PERFORMED BY SEPARATING BY HALF SIZE SPACE<br>・CONFERENCE ID: SPECIFY CONFERENCE ID AND USE WHEN ACQUIRING LIST. SEPARATE BY HALF SIZE SPACE WHEN MAKING PLURAL REQUESTS. |
| | [RESPONSE MESSAGE]<br>    <iq type="result" id="ID" from="DOMAIN" to="USER JID"/><br>        <getconferencelist xmlns="http://AAA.com/saurel/getconferencelist"><br>           <listitems>NUMBER OF SEARCH RESULTS<br>              <listitem><br>                  <conference_id>CONFERENCE ID</conference_id><br>                  <conference_name>CONFERENCE NAME</conference_name><br>                  <startdate>CONFERENCE DATE</startdate><br>                  <pwdflag>WHETHER THERE IS PASSWORD</pwdflag><br>                  <removalflag>AUTHORIZATION FOR DOWNLOADING CONFERENCE MATERIAL</removalflag><br>                  <presenter_lock>AUTHORIZATION FOR CHANGING PRESENTER</presenter_lock><br>                  <conference_status>CONFERENCE STATUS</conference_status><br>              </listitem><br>              <listitem><br>                  (REPEAT)<br>              </listitem><br>           </listitems><br>        </getconferencelist><br>    </iq> |
| HOLD/ ATTEND CONFERENCE | [REQUEST MESSAGE]<br>    <presence to="CONFERENCE USER JID" id="ID"><br>        <x><br>            <pwd>PASSWORD<pwd><br>        </x><br>    </presence><br><br>[RESPONSE MESSAGE]<br>    <presence from="CONFERENCE USER JID" to="USER JID" id="ID"><br>        <x><br>            <status code="STATUS"/><br>        </x><br>    </presence><br><br>STATUS IS 201 IF SUCCESSFUL AND 501 IF UNSUCCESSFUL |

FIG.7

| INSTRUCTION | DESCRIPTION |
|---|---|
| EXIT CONFERENCE | [REQUEST MESSAGE]<br><presence to="CONFERENCE USER JID" id="ID" type="unavailable" /><br><br>[RESPONSE MESSAGE]<br><presence from="CONFERENCE USER JID" to="USER JID" id="ID" type="unavailable" /> |
| ACQUIRE MATERIAL URL | [REQUEST MESSAGE]<br><iq to="CONFERENCE JID" id="ID" type="get" class="RequestDownloadURL" operation="update"><br>  <body>REQUESTCOMMAND_DOWNLOADURL</body><br></iq><br><br>[DESCRIPTION]<br><br>[RESPONSE MESSAGE]<br><iq from="CONFERENCE JID" to="USER JID" id="ID" type="result" class="RequestDownloadURL" operation="update"><br>  <body> [DOCUMENT ID][MATERIAL URL] </body><br></iq><br><br>[DESCRIPTION] |
| ADD MATERIAL URL | [REQUEST MESSAGE]<br><iq to="CONFERENCE JID" id="ID" type="set" class="RequestAddDocument" operation="update"><br>  <body>MATERIAL URL</body><br></iq><br><br>[DESCRIPTION]<br><br>[RESPONSE MESSAGE]<br><iq from="CONFERENCE JID" to="USER JID" id="ID" type="result" class="RequestAddDocument" operation="update"><br>  <body>STATUS</body><br></iq><br><br>[DESCRIPTION]<br>STATUS IS SUCCESSFUL IF "OK" AND UNSUCCESSFUL IF "NG" |

FIG.11

| | |
|---|---|
| UPLOAD CONFERENCE MATERIAL | [HTTP REQUEST]<br>POST /meeting/\<CONFERENCE ID\> HTTP/1.1<br>Host: \<SERVER IP ADDRESS\>:8080<br>Content-Length: \<NUMBER OF BYTES OF BINARY DATA OF FILE\><br>Authorization: Basic \<CHARACTER STRING ENCODING PASSWORD\><br>X-Keyword: \<KEYWORD DEFINED IN SYSTEM\><br><br>\<BINARY DATA OF FILE\><br><br>[HTTP RESPONSE]<br>HTTP/1.1 201 Created<br>Content-Length: 0<br>Location: \<URL\> |
| DOWNLOAD CONFERENCE MATERIAL | [HTTP REQUEST]<br>GET /doc/\<DOCUMENT ID\> HTTP/1.1<br>Host: \<SERVER IP ADDRESS\>:8080<br>Authorization: Basic \<CHARACTER STRING ENCODING PASSWORD\><br>X-Keyword: \<KEYWORD DEFINED IN SYSTEM\><br><br>[HTTP RESPONSE]<br>HTTP/1.1 200 OK<br>Content-Length: \<NUMBER OF BYTES OF BINARY DATA OF FILE\><br><br>\<BINARY DATA OF FILE\> |

FIG.12

| TYPE OF MESSAGE | DATA FORMAT |
|---|---|
| SPECIFY DISPLAY PAGE | `<message type="groupchat", from="XXXX", to="YYYY">`<br>`<body>`<br>`<conference operation="update">`<br>   `2`<br>`</conference>`<br>`</body>`<br>`</message>` |
| ADD FIGURE | `<message type="groupchat", from="XXXX", to="YYYY">`<br>`<body>`<br>`<conference operation="add">`<br>   `<autoshape id="as1" x=100 y=100>`<br>     `<svg>`<br>      ....<br>     `</svg>`<br>   `</autoshape>`<br>`</conference>`<br>`</message>` |
| DELETE FIGURE | `<message type="groupchat", from="XXXX", to="YYYY">`<br>`<body>`<br>`<conference operation="delete">`<br>   `<autoshape id="as1"></autoshape>`<br>`</conference>`<br>`</message>` |
| UPDATE HANDWRITTEN MEMORANDUM | `<message type="groupchat", from="XXXX", to="YYYY">`<br>`<body>`<br>`<conference operation="update">`<br>   `<ink>`<br>   ....<br>   `</ink>`<br>`</conference>`<br>`</body>`<br>`</message>` |

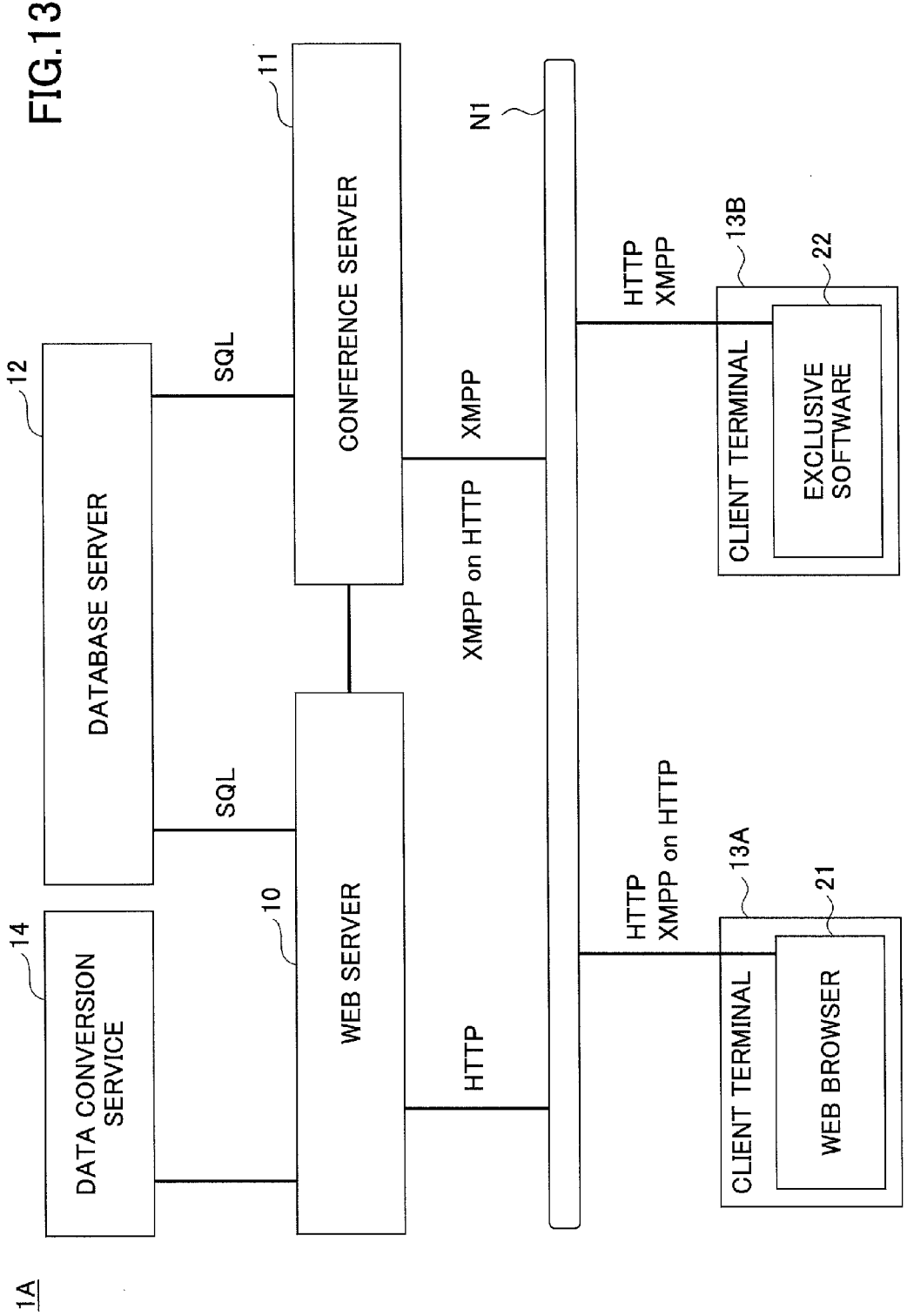

INFORMATION PROCESSING DEVICE AND CONFERENCE SYSTEM

BACKGROUND OF THE INVENTION

1. Field of the Invention

The present invention relates to an information processing device and a conference system.

2. Description of the Related Art

Conventionally, there is known an electronic conference system for sharing materials among attendees (see, for example, Patent Document 1).

Furthermore, there is conventionally known a material presenting system including a plurality of mobile terminals and a server. The server includes a download unit for downloading the material to all of the plurality of mobile terminals, and a forced discarding unit for causing all of the plurality of mobile terminals to discard the material after the presentation of the material has ended (see, for example, Patent Document 2).

In the conventional conference system, contents of the conference material have been prevented from being leaked to unidentified users by using user authentication. However, in a conventional conference system using user authentication, it is necessary to register information used for user authentication in advance. Therefore, such a conference system cannot be used for conferences for which the attendees are not determined in advance.

Patent Document 1: Japanese Laid-Open Patent Publication No. 2005-284344

Patent Document 2: Japanese Laid-Open Patent Publication No. 2012-123736

SUMMARY OF THE INVENTION

The present invention provides an information processing device and a conference system, in which one or more of the above-described disadvantages are eliminated.

According to an aspect of the present invention, there is provided an information processing device including a content acquisition request receiving unit configured to receive a content acquisition request to acquire a content, which is to be shared among a plurality of client terminals attending a conference, from at least one of the plurality of client terminals; a content provision allowance determining unit configured to use first information to determine whether the content is allowed to be provided in response to the content acquisition request from the at least one of the plurality of client terminals, the first information being used for attending the conference during the conference and used for acquiring the content at times other than during the conference when the content is allowed to be provided; and a content providing unit configured to provide the content to the at least one of the plurality of client terminals which is a source of the content acquisition request, when a result of the determination is that the content is allowed to be provided.

According to an aspect of the present invention, there is provided a non-transitory computer-readable recording medium storing a program that causes an information processing device to execute a process including receiving a content acquisition request to acquire a content, which is to be shared among a plurality of client terminals attending a conference, from at least one of the plurality of client terminals; determining, by using first information, whether the content is allowed to be provided in response to the content acquisition request from the at least one of the plurality of client terminals, the first information being used for attending the conference during the conference and used for acquiring the content at times other than during the conference when the content is allowed to be provided; and providing the content to the at least one of the plurality of client terminals which is a source of the content acquisition request, when a result of the determination is that the content is allowed to be provided.

According to an aspect of the present invention, there is provided a conference system including a plurality of client terminals attending a conference; at least one information processing device configured to provide a content that is to be shared among the plurality of client terminals; a content acquisition request receiving unit configured to receive a content acquisition request to acquire the content, from at least one of the plurality of client terminals; a content provision allowance determining unit configured to use first information to determine whether the content is allowed to be provided in response to the content acquisition request from the at least one of the plurality of client terminals, the first information being used for attending the conference during the conference and used for acquiring the content at times other than during the conference when the content is allowed to be provided; and a content providing unit configured to provide the content to the at least one of the plurality of client terminals which is a source of the content acquisition request, when a result of the determination is that the content is allowed to be provided.

BRIEF DESCRIPTION OF THE DRAWINGS

Other objects, features and advantages of the present invention will become more apparent from the following detailed description when read in conjunction with the accompanying drawings, in which:

FIG. 3 illustrates an example of a configuration of the conference system using XMPP;

FIG. 4 illustrates a configuration example of conference information;

FIG. 5 illustrates examples of instructions prepared in a conference server;

FIG. 6 illustrates examples of instructions prepared in a conference server;

FIG. 7 illustrates examples of instructions prepared in a conference server;

FIG. 11 illustrates an example of services prepared in a web server;

FIG. 12 illustrates an example of a XMPP message; and

FIG. 13 illustrates a configuration of an example of a conference system using XMPP according to another embodiment.

DETAILED DESCRIPTION OF THE PREFERRED EMBODIMENTS

A description is given, with reference to the accompanying drawings, of embodiments of the present invention.

First Embodiment

System Configuration

Figure 1:
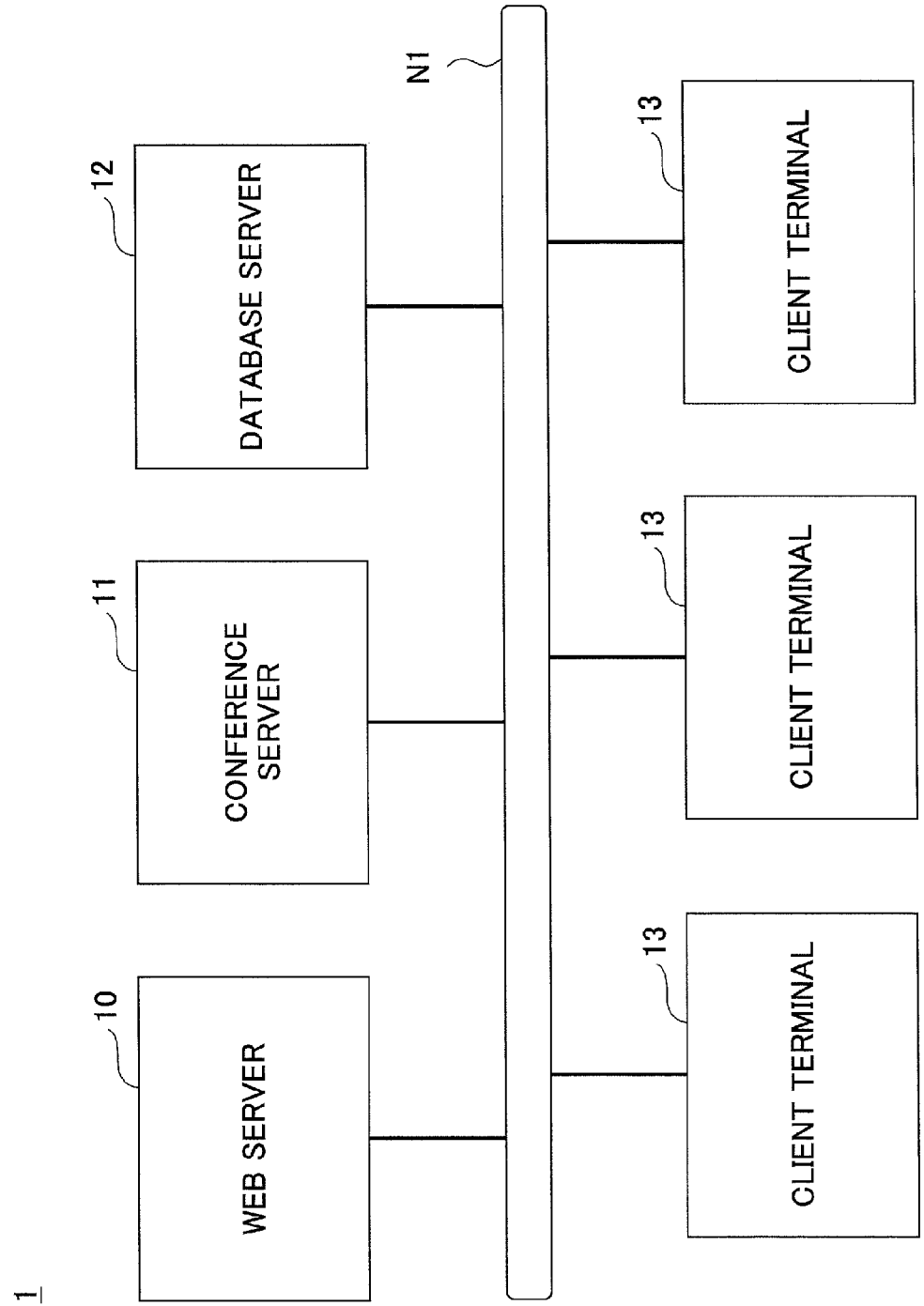
FIG. 1 illustrates a configuration of an example of a conference system according to an embodiment.

FIG. 1 illustrates a configuration of an example of a conference system 1 according to the present embodiment. The conference system 1 illustrated in FIG. 1 includes a web server 10, a conference server 11, a database server 12, and a plurality of client terminals 13, which are connected to a network N1 such as LAN (Local Area Network).

The web server 10, the conference server 11, and the database server 12 may be software and services that operate in separate computers, or software and services that operate in a single computer. Furthermore, the web server 10, the conference server 11, and the database server 12 may be in the format of a so called cloud service.

The web server 10 accumulates information such as HTML documents and CSS (Cascading Style Sheets) accompanying the HTML documents, JavaScript (registered trademark) files, and image files. A JavaScript file is an example of a file described in a script language (simplified programming language). The web server 10 is software having a function of sending information by WWW (World Wide Web). The web server 10 is realized by, for example, free software such as Apache HTTP Server or IIS (Internet Information Services) provided by Microsoft.

The conference server 11 manages the conference of a paperless conference system (creating a conference, editing, deleting, and searching; performing necessary communications with the client terminals 13 during the conference). The conference server 11 is software for providing services for realizing real-time communications through the network N1. The conference server 11 is realized by, for example, NET Messenger Service provided by Microsoft or XMPP (Extensible Messaging and Presence Protocol) [RFC3920], [RFC3921].

The database server 12 accumulates registered conference information and conference materials. A conference material is an example of contents. The database server 12 is realized by a relational database operated by, for example, SQL (Structured Query Language).

The client terminal 13 is a terminal device operated by the user. The client terminals 13 are, for example, a desktop PC, a notebook PC, a tablet PC, a smartphone, a mobile phone, and a projector. The client terminal 13 can access the web server 10 and the conference server 11.

Hardware Configuration

Figure 2:
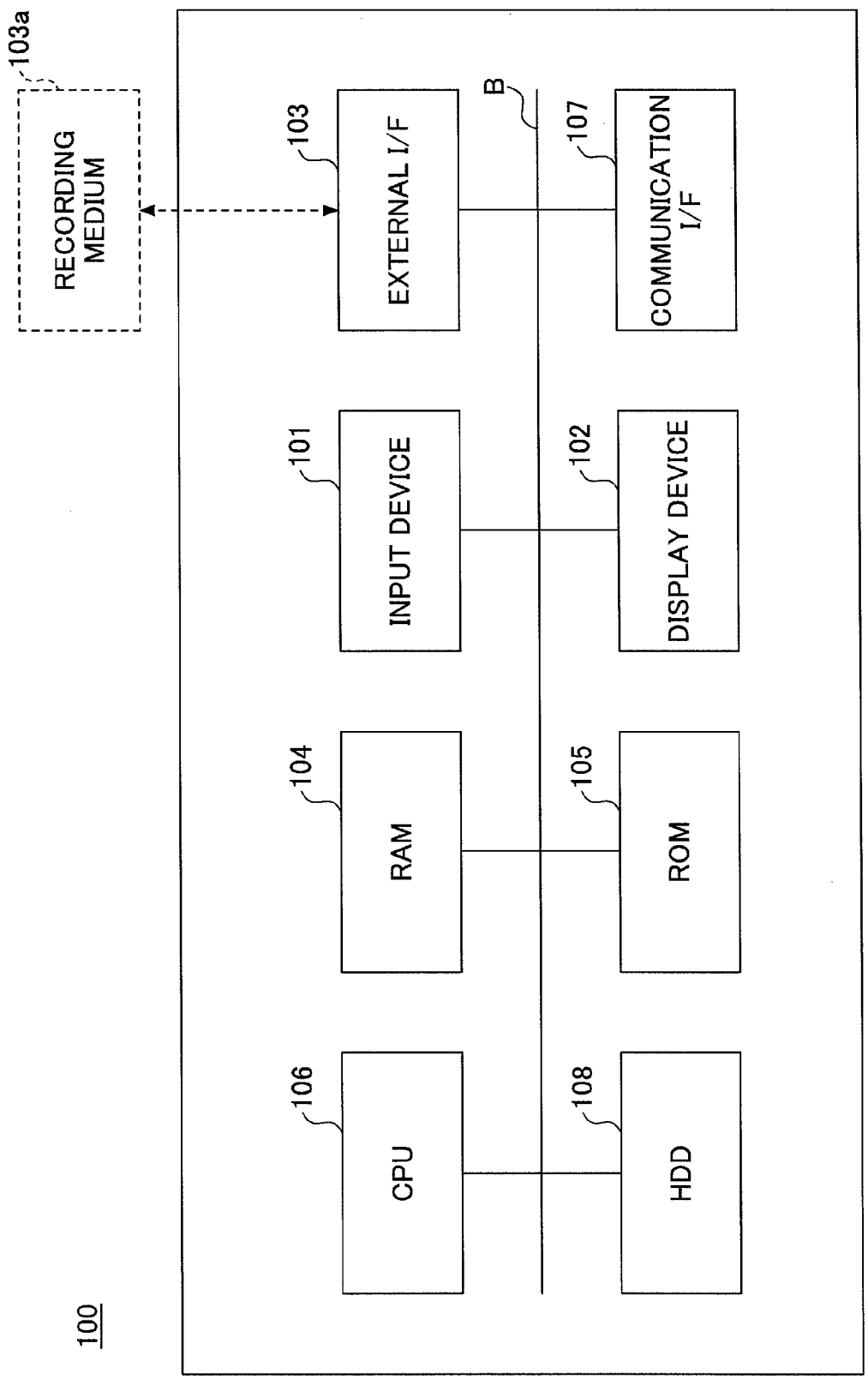
FIG. 2 is a hardware configuration of an example of a computer according to an embodiment.

The web server 10, the conference server 11, the database server 12, and the client terminals 13 are realized by, for example, a computer 100 having a hardware configuration as illustrated in FIG. 2.

FIG. 2 is a hardware configuration of an example of the computer 100 according to the present embodiment. The computer 100 illustrated in FIG. 2 includes an input device 101, a display device 102, an external I/F 103, a RAM (Random Access Memory) 104, a ROM (Read Only Memory) 105, a CPU (Central Processing Unit) 106, a communication I/F 107, and a HDD (Hard Disk Drive) 108, which are interconnected by a bus B.

The input device 101 includes a keyboard and a mouse, and is used for inputting various operation signals in the computer 100. The display device 102 includes a display, and displays processing results by the computer 100.

The communication I/F 107 is an interface for connecting the computer 100 to the network N1. Accordingly, the computer 100 may perform data communications with another computer 100 via the communication I/F 107.

The HDD 108 is a non-volatile storage device storing programs and data. The stored programs and data include an OS (Operating System) which is the basic software controlling the entire computer 100, and application software providing various functions on the OS. Furthermore, the HDD 108 manages the stored programs and data by a predetermined file system and/or a DB (DataBase).

The external I/F 103 is an interface between the computer 100 and an external device. An example of the external device is a recording medium 103a. Accordingly, the computer 100 can read information from and/or write information in the recording medium 103a via the external I/F 103. Examples of the recording medium 103a are a flexible disk, a CD (Compact Disk), a DVD (Digital Versatile Disk), a SD memory card, and a USB memory (Universal Serial Bus memory).

The ROM 105 is a non-volatile semiconductor memory (storage device) that can hold programs and data even after the power is turned off. The ROM 105 stores programs and data such as BIOS (Basic Input/Output System) executed when the computer 100 is activated, OS settings, and network settings. The RAM 104 is a volatile semiconductor memory (storage device) for temporarily holding programs and data.

The CPU 106 is a processor for realizing the control and functions of the entire computer 100 by loading the programs and data in the RAM 104 from storage devices such as the ROM 105 and the HDD 108, and executing processes.

The web server 10, the conference server 11, the database server 12, and the client terminals 13 execute programs in the computer 100 having the above-described hardware configuration example, so that various process described below are realized.

Details of Processes

In the following, a detailed description is given of a process of the conference system 1 according to the present embodiment. The conference system 1 in which the conference server 11 uses an instant messenger using XMPP to communicate with the client terminals 13, is taken as an example in the following description.

FIG. 3 illustrates an example of a configuration of the conference system 1 using XMPP. The conference system 1 illustrated in FIG. 3 includes the web server 10, the conference server 11, and client terminals 13A and 13B, which are connected to the network N1. The web server 10 and the conference server 11 are connected to the database server 12. Furthermore, in the client terminal 13A, a web browser 21 is installed. In the client terminal 13B, exclusive software 22 is installed. When reference is made to both the client terminals 13A and 13B, these are simply referred to as the client terminals 13.

XMPP is standardized at IETF as RFC3920 (Extensible Messaging and Presence Protocol: Core), RFC3921 (Extensible Messaging and Presence Protocol: Instant Messaging and Presence), and the extended specifications are documented as XEP.

With XMPP, a service referred to as group chat (Multi-User Chat [XEP-0045]) can be provided. Group chat is a function by which, when a message is sent to the conference server 11 from the client terminal 13 attending the conference room (room) provided by XMPP, the message is distributed to all client terminals 13 attending the conference room from the conference server 11.

In XMPP, there is a technology referred to as BOSH (Bidirectional-streams Over Synchronous HTTP) [XEP-0206] for transmitting and receiving messages by HTTP. By using BOSH, the conference server 11 may not only perform XMPP communications by HTTP, but may also realize a Push function that is not usually provided. The Push function does not send information upon receiving a request from the client terminal 13; the Push function is for sending information in a non-synchronous manner from the conference server 11 to the client terminals 13, and receiving the information at the client terminals 13. In this specification, the operation of performing XMPP communications by HTTP is expressed as XMPP on HTTP. Actually, XMPP transmits and receives XML (Extensible Markup Language) data. In XMPP on HTTP, XML data of XMPP is transmitted and received by HTTP.

In BOSH, a special proxy referred to as CM (Connection Manager) is introduced. CM exchanges XML data of regular XMPP with the conference server 11. Furthermore, CM exchanges wrapped XML data of XMPP by HTTP, with the web server 10 that is a HTTP client. Note that the client terminal 13A communicates with the conference server 11 by XMPP on HTTP. The client terminal 13B directly communicates with the conference server 11 by XMPP messages.

The conference server 11 has a conference management function. In response to a request to create a conference, an editing request, and a deleting request from the client terminals 13, the conference server 11 applies the conference information in the database server 12 by using SQL. The conference information includes the statuses of before conference, during conference, and after conference, as the conference status.

Furthermore, the conference server 11 processes the requests of opening, attending, exiting, and ending a conference, from the client terminal 13. During a conference, the conference server 11 manages and controls shared conference information (conference material information, display page of conference material, and handwritten memorandum data). After the conference, the conference server 11 performs download management of the conference material. A request from the client terminal 13 to the conference server 11 is made by a message using XMPP.

The web server 10 stores HTML files (HTML documents) displayed by the web browser 21 installed in the client terminal 13A, CSS files attached to the HTML files, JavaScript files, and image files. For specifying the web server 10 and a HTML file from the web browser 21, a URL (Uniform Resource Locator) is used.

Furthermore, in the conference system 1, an Ajax (Asynchronous JavaScript XML) technology is used, to operate DOM (Document Object Model) and overwrite the contents displayed by the web browser 21. The Ajax technology is an implementation format of using a HTTP communication function of a JavaScript file to exchange XML data without reloading the web page and proceed with the process.

The method of overwriting the contents displayed by the web browser 21 is not limited to the method of updating DOM. For example, with "HTML 5", the contents displayed by the web browser 21 may be directly overwritten.

In the conference system 1, the web server 10 is used for the web browser 21 of the client terminal 13A to communicate with the conference server 11. Furthermore, as means for uploading and downloading conference materials, XMPP messages are inappropriate for communicating binary data having a large size. Thus, the conference system 1 uses a GET request and a POST request of HTTP to upload and download conference material.

Conference materials are accumulated in the database server 12, according to requests to save (upload) the conference materials from the client terminal 13 to the conference server 11. Furthermore, when downloading conference materials, the client terminal 13 acquires, from the conference server 11, a URL (material URL) for specifying the web server 10 and the conference material. The client terminal 13 uses the acquired material URL to access the web server 10, and downloads the conference material by a HTTP GET/POST request. The web server 10 acquires the conference material from the database server 12 using SQL, and sends the conference material to the client terminal 13 by a response to the HTTP GET/POST request.

Furthermore, the conference system 1 creates XML data by JavaScript according to a selection of a conference material to be displayed on the client terminal 13, the display page of the conference material to be displayed, the text and figures to be rendered on the displayed conference material, and user input (operation) such as a handwritten memorandum, and then sends the XML data by group chat to the conference server 11 using XMPP on HTTP.

The conference server 11 distributes XML data to all client terminals 13 attending the conference room by using XMPP or XMPP on HTTP. The client terminal 13A interprets the XML data by JavaScript, and operates (updates) DOM to update the display of the conference material to be displayed, the display page of the conference material to be displayed, the text and figures to be rendered on the displayed conference material, and a handwritten memorandum.

The client terminal 13B interprets the XML data by the exclusive software 22, and updates the display of the conference material to be displayed, the display page of the conference material to be displayed, the text and figures to be rendered on the displayed conference material, and a handwritten memorandum.

FIG. 4 illustrates a configuration example of conference information. The conference information illustrated in FIG. 4 includes items such as a conference ID, a conference name, a conference date, a password, authorization for downloading conference material, authorization for changing presenter, the conference status, and conference material.

The conference ID is information for uniquely identifying a conference, which is set by the conference server 11 to automatically be a unique ID, in response to a request to create a conference from the client terminal 13. A conference name is arbitrarily set by the user, and is used by the user for identifying a conference. A conference date is arbitrarily set by the user, which may be the scheduled time of starting the conference, and is used by the user for identifying a conference.

A password is information used for attending the conference and downloading the conference material. When a password is set, the user cannot attend the conference unless the user is aware of the password. Furthermore, when a password is set, the user cannot download the conference material unless the user is aware of the password. When a password is not set, the user can freely attend the conference and freely download the conference material.

The authorization for downloading the conference material is the information (for example, TRUE/FALSE) indicating whether to authorize the downloading of the conference material at times other than during the conference. The authorization for changing presenter is information (for example, TRUE/FALSE) indicating whether the presenter can be changed during the conference. The presenter is for switching the page of the conference material and describing a handwritten memorandum in the conference material, which is a role applicable to the display of all client terminals 13 attending the conference.

The conference status expresses one of the three statuses of before conference, during conference, and after conference. The conference status is an item set by the conference server 11, which is changed by the conference server 11 according to the status. When a conference is newly created, the conference status is set to "before conference". When the conference begins, the conference status is set to "during conference". When all attendees of the conference exit and the conference ends, the conference status is set to "after conference". The conference material indicates binary data of the document (conference material) used in the conference.

FIGS. 5 through 7 illustrate examples of instructions prepared in the conference server 11. In the conference system 1, XMPP is used for communications between the conference server 11 and the client terminal 13. As illustrated in FIGS. 5 through 7, a request from the client terminal 13 to the conference server 11 is sent by an iq message and a presence message of XMPP. The client terminal 13 acquires information by a response to the request made to the conference server 11.

FIG. 5 illustrates a request message and a response message when creating a conference, editing a conference, and deleting a conference. FIG. 6 illustrates a request message and a response message when searching the conference information and holding/attending a conference. FIG. 7 illustrates a request message and a response message when exiting a conference, acquiring a material URL, and adding a material URL.

When a request message as illustrated in FIGS. 5 through 7 is received, the conference server 11 applies information of the request message to the conference information in the database server 12. Furthermore, by sending the response message as illustrated in FIGS. 5 through 7 to the client terminal 13, the conference server 11 sends information to the client terminal 13.

For example, when a password is included in the requested message for creating a conference, the conference server 11 sets a password in the conference information. When a password is set in the conference information for a conference, it is not possible to hold/attend this conference unless a correct password is included in the request for holding/attending the conference.

For example, when a request message for holding a conference including a correct password is received, the conference server 11 creates a conference room (room) of XMPP. By entering the created conference room, the client terminal 13 of the user can attend the conference.

Figure 8:
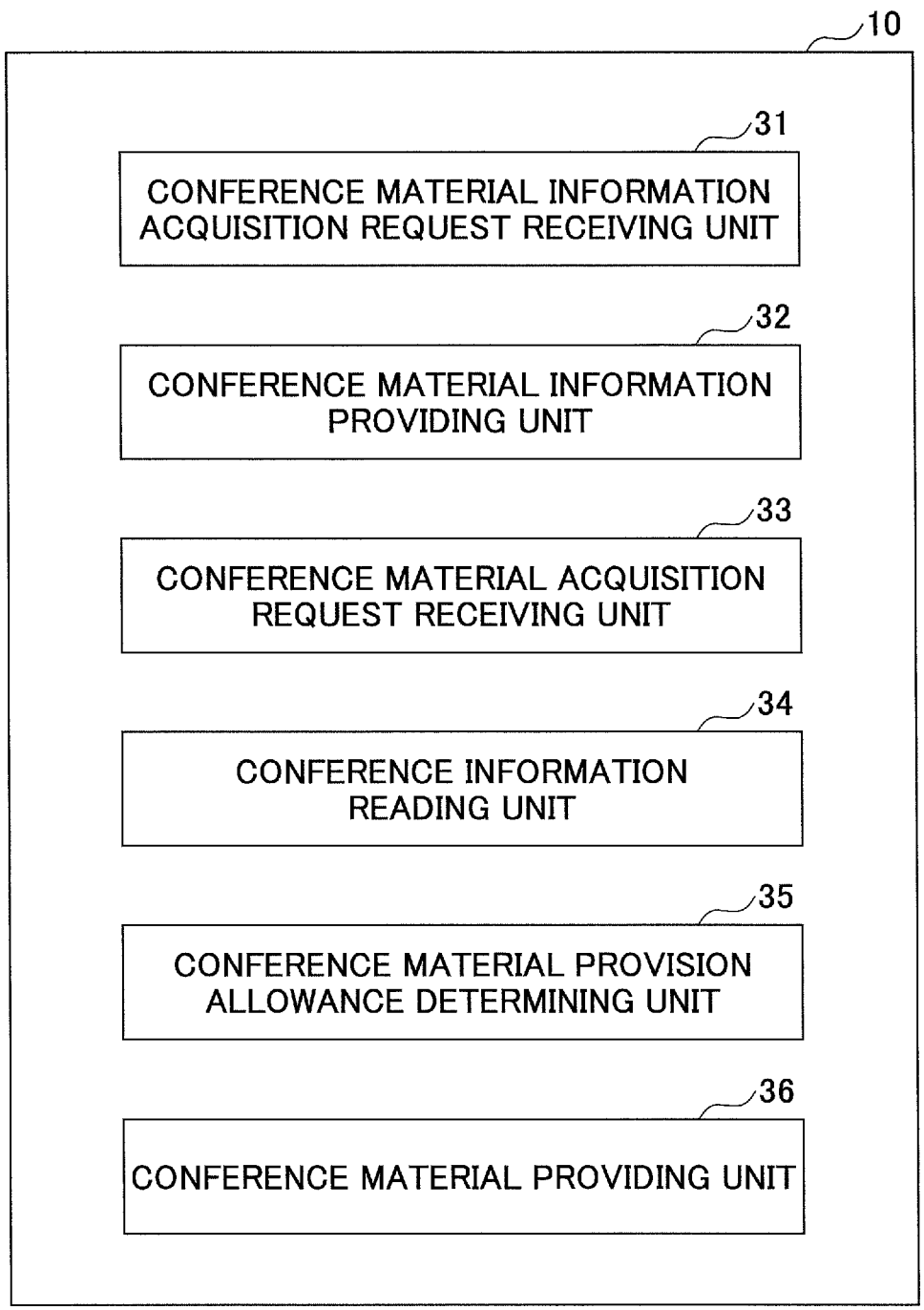
FIG. 8 is a functional block diagram of an example of a web server for performing a process of providing the conference material.

The web server 10 providing a conference material to the client terminal 13 is constituted by, for example, the functional blocks as illustrated in FIG. 8. FIG. 8 is a functional block diagram of an example of the web server 10 for performing the process of providing the conference material.

The web server 10 of FIG. 8 includes a conference material information acquisition request receiving unit 31, a conference material information providing unit 32, a conference material acquisition request receiving unit 33, a conference information reading unit 34, a conference material provision allowance determining unit 35, and a conference material providing unit 36.

The conference material information acquisition request receiving unit 31 receives a request to acquire conference material information such as a material URL. The conference material information providing unit 32 provides conference material information to the source of the request to acquire conference material information. The conference material acquisition request receiving unit 33 receives a request to acquire the conference material. The conference information reading unit 34 reads the conference information from the database server 12. The conference material provision allowance determining unit 35 checks the conference information read by the conference information reading unit 34, and determines whether to allow the providing of the conference information. The conference material providing unit 36 provides the conference material to the source of the request to acquire the conference material, when the conference material provision allowance determining unit 35 determines that the providing of the conference material is allowed.

Figure 9:
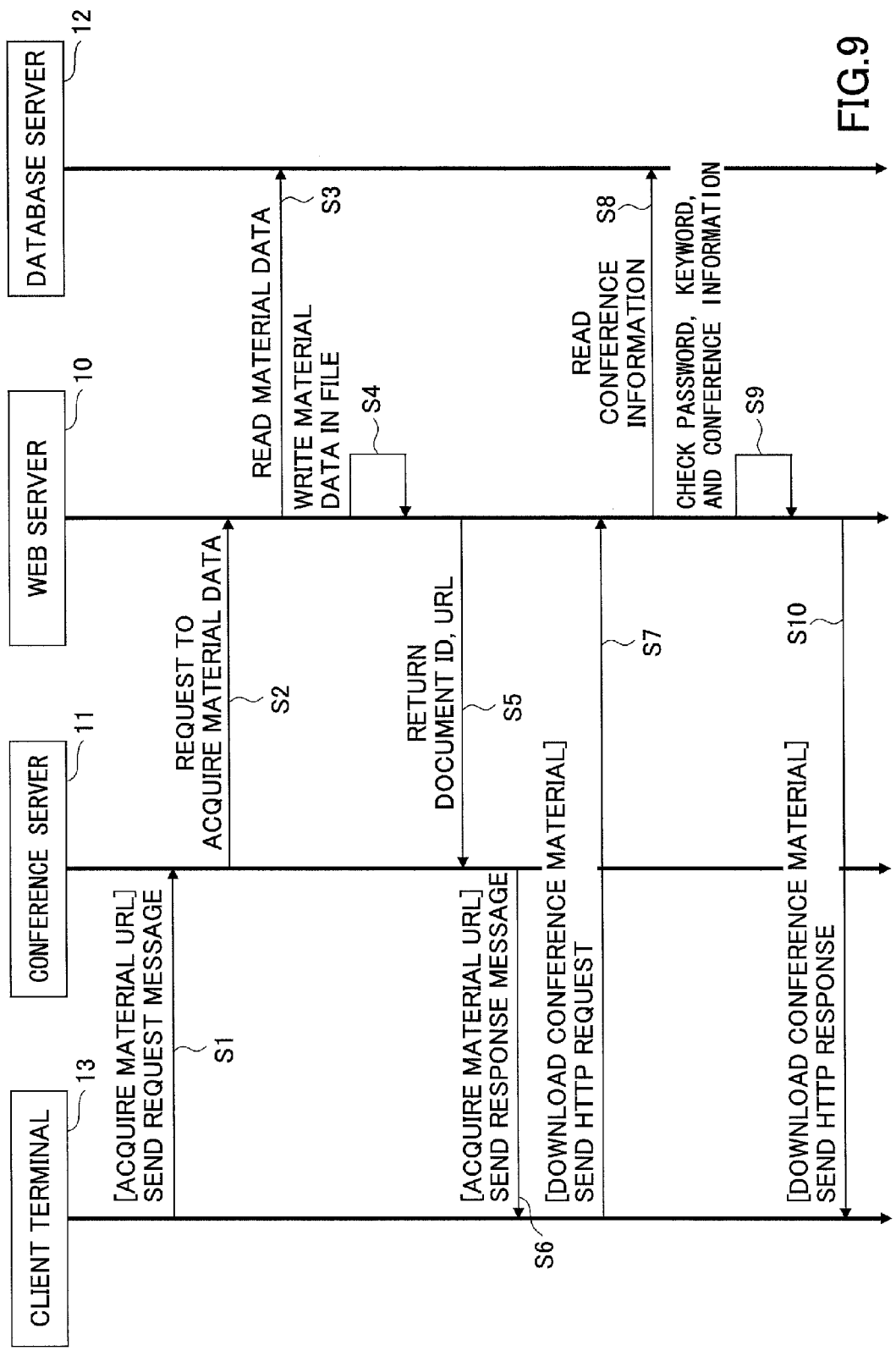
FIG. 9 is a sequence diagram of an example of a process of acquiring the conference material.

In the conference system 1, the client terminal 13 acquires the conference material by, for example, procedures illustrated in FIG. 9. FIG. 9 is a sequence diagram of an example of a process of acquiring the conference material. In step S1, the client terminal 13 sends, to the conference server 11, a request message to acquire the material URL as illustrated in FIG. 7. As illustrated in FIG. 7, the request message to acquire the material URL includes the conference ID.

In step S2, the conference server 11 specifies the conference ID, and requests the web server 10 to acquire material data. In step S3, the web server 10 reads, from the database server 12, the binary data of the conference material (material data) corresponding to the conference ID, based on the specified conference ID and the conference information illustrated in FIG. 4. In step S4, the web server 10 writes the material data in the file.

In step S5, the web server 10 returns the document ID and the material URL to the conference server 11. A document ID uniquely indicates a document, and may be created as a character string by connecting the order of the document to the conference ID. By creating such a document ID, the conference ID can be identified from the document ID.

In step S6, the conference server 11 sends, to the client terminal 13, a response message indicating the acquisition of the material URL as illustrated in FIG. 7. As illustrated in FIG. 7, the response message indicating the acquisition of the material URL includes a document ID and a material URL.

In step S7, the client terminal 13 sends the HTTP request for downloading the conference material, to the web server 10. Details of the HTTP request for downloading the conference material are described below.

In step S8, the web server 10 reads the conference information from the database server 12. In step S9, the web server 10 performs a check process of authorizing or not authorizing the downloading of the conference material, based on the password and the keyword included in the HTTP request for downloading the conference material, and the conference information read from the database server 12. Details of the check process of authorizing or not authorizing the downloading of the conference material are described below.

In step S10, the web server 10 sends a HTTP response for downloading the conference material to the client terminal 13. Details of the HTTP response for downloading the conference material are described below. When the result of the check process is to authorize the downloading of the conference material, the HTTP response for downloading the conference material includes the binary data of the conference material (material data). According to the sequence of FIG. 9, the client terminal 13 can download the conference material.

Figure 10:
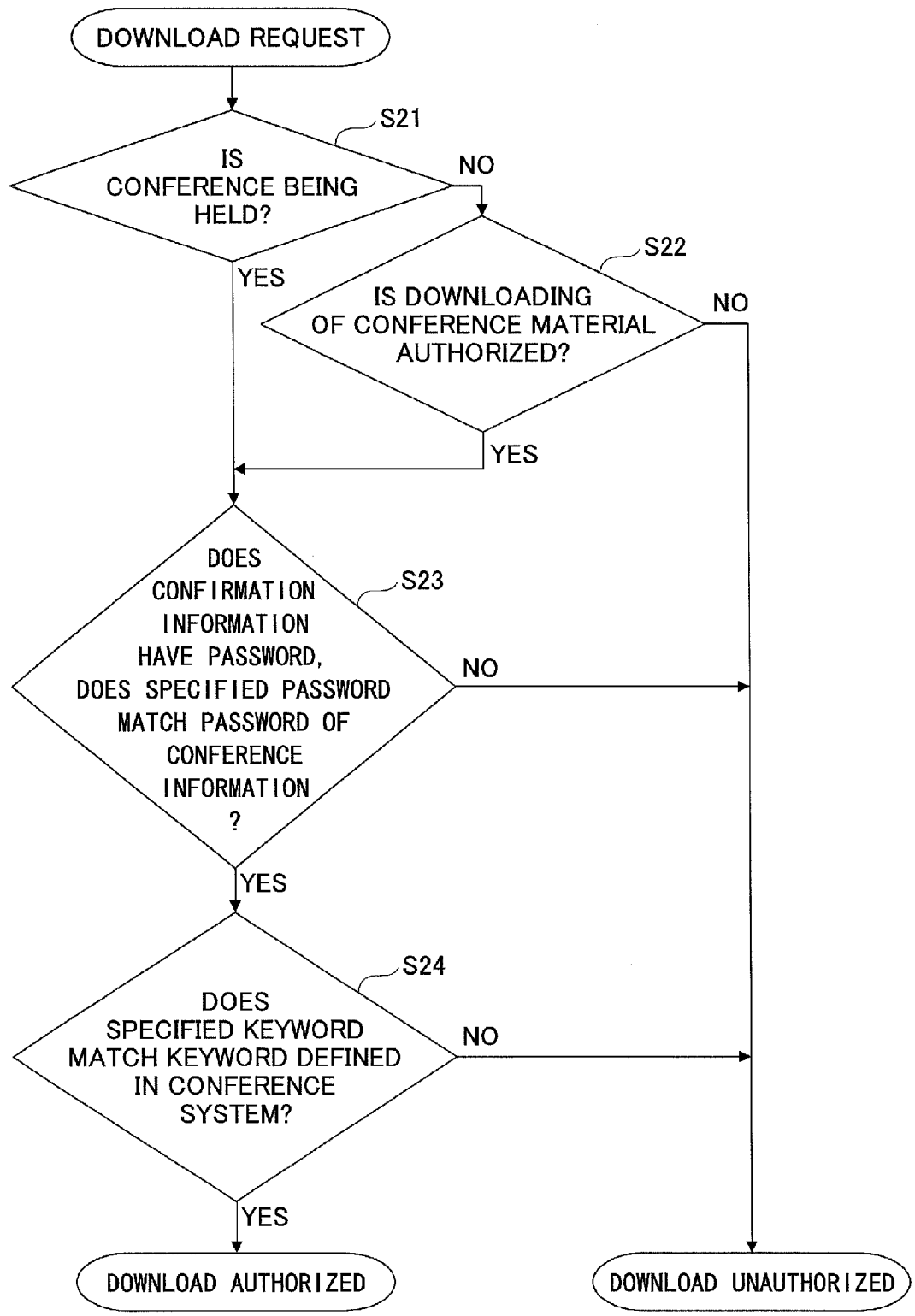
FIG. 10 is a flowchart of an example of a check process of authorizing or not authorizing the downloading of the conference material.

The check process of authorizing or not authorizing the downloading the conference material of step S9 is performed, for example, according to the flowchart of FIG. 10. FIG. 10 is a flowchart of an example of a check process of authorizing or not authorizing the downloading the conference material.

In step S21, the web server 10 refers to the conference status included in the conference information, and determines whether the conference is being held. When the conference is not being held, the web server 10 proceeds to step S22, refers to the "authorization for downloading conference material" included in the conference information, and determines whether the downloading of the conference material is authorized.

When the downloading of the conference material is unauthorized, the web server 10 determines that the downloading of the conference material is unauthorized. Meanwhile, when the downloading of the conference material is authorized, the web server 10 performs the process of step S23. Furthermore, also when the web server 10 determines that the conference is being held in step S21, the web server 10 performs the process of step S23.

In step S23, the web server 10 determines whether there is a password in the conference information, and whether the password included in the HTTP request for downloading the conference material matches the password included in the conference information.

When there is a password in the conference information, and when the password included in the HTTP request for downloading the conference material does not match the password included in the conference information, the web server 10 determines that the downloading of the conference material is unauthorized. When there is no password in the conference information, or when the password included in the HTTP request for downloading the conference material matches the password included in the conference information, the web server 10 performs the process of step S24.

In step S24, the web server 10 determines whether the keyword included in the HTTP request for downloading the conference material matches the keyword specified in the conference system 1.

When the keyword included in the HTTP request for downloading the conference material matches the keyword specified in the conference system 1, the web server 10 authorizes the downloading of the conference material. Meanwhile, when the keyword included in the HTTP request for downloading the conference material does not match the keyword specified in the conference system 1, the web server 10 does not authorize the downloading of the conference material.

As described above, in the conference system 1, when a conference is being held, the password for attending the conference and the password for downloading the conference material are the same.

FIG. 11 illustrates an example of services prepared in the web server 10. The web server 10 expresses services of uploading/downloading the conference material. The HTTP includes a HTTP request and a HTTP response. The HTTP request is a communication performed by the web browser 21 for requesting the web server 10 to acquire information. The HTTP response is a communication performed by the web server 10 for returning a response to the HTTP request from the web browser 21.

The HTTP request includes three parts; a HTTP request line, a HTTP header, and a data main body. The HTTP response includes three parts; a response status line, a HTTP header, and a data main body. These are defined by RFC2616.

The HTTP request line includes the method applied to the resource, the identifier of the resource, and the version to be used. In HTTP/1.1, eight methods are defined, such as GET and POST.

The format of the header used in HTTP/1.1 is defined by RFC2616. In RFC822, there is an item regarding a user defined header, defining an arbitrary field, and transmission is possible. The name of the arbitrary field starts with "X–".

In the present embodiment, HTTP/1.1 is used, a POST message is used for the HTTP request to upload the conference material, and a GET message is used for to download the conference material. Furthermore, when a password is set for the conference, a password is needed for the HTTP request to upload the conference material and to download the conference material.

Thus, when a password is set for the conference, in the HTTP request for uploading the conference material and downloading the conference material, the password is specified in the Authorization field of the HTTP header upon encoding the password by a specified encoding method.

Furthermore, in the present embodiment, in a specified arbitrary field (X-Keyword field) in the conference system 1, a keyword specified in the conference system 1 is specified, so that the security of the conference system 1 is reinforced. The keyword specified in the conference system 1 is determined, for example, by having the administrator set the keyword in advance. The client terminal 13 includes a means for acquiring the specified keyword from the conference server 11. The client terminal 13 may request the conference server 11 to acquire the specified keyword by an iq message of XMPP.

Furthermore, in the conference system 1, other than the X-Keyword field, a User-Agent field may be used to restrict the uploading of the conference material and the downloading of the conference material. In the web browser 21, a user agent specified in the User-Agent field cannot usually be changed.

However, when developing the exclusive software 22, the User-Agent field may be freely specified. Therefore, by specifying a specified user agent in the conference system 1, it is possible to restrict the client terminal 13B that can upload the conference material and download the conference material.

The flow of the process of uploading the conference material is as follows. Note that in the conference system 1, it is necessary to create in advance the conference into which the conference material is to be uploaded. The client terminal 13 sends, to the web server 10, a HTTP request to upload the conference material in which the conference ID is specified. When the uploading of the conference material is successful, the client terminal 13 receives a HTTP response returned from the web server 10 in which the URL of the conference material is set. The client terminal 13 sends, to the conference server 11, a request message of adding the material URL as illustrated in FIG. 7, to add the conference material to the conference corresponding to the specified conference ID.

Furthermore, the flow of the process of downloading the conference material is as follows. The client terminal 13 sends, to the web server 10, a request message of acquiring the material URL as illustrated in FIG. 7. When the client terminal 13 receives a response message of acquiring the material URL as illustrated in FIG. 7 returned from the web server 10, the client terminal 13 can acquire the document ID and the material URL of the conference material. The client terminal 13 uses the acquired material URL to access the web server 10, and sends a HTTP request in which the acquired document ID is specified for downloading the conference material. Then, the client terminal 13 can receive the binary data of the conference material by a HTTP response for downloading the conference material.

Next, a simple description is given of a process performed when the conference is held in the conference system 1. The presenter performs an action to the client terminal 13, such as specifying a display page, adding a figure, deleting a figure, and updating a handwritten memorandum.

The client terminal 13 of the presenter creates a XMPP message corresponding to the action of the presenter, and sends the XMPP message to the conference server 11 directly or via the web server 10.

When the XMPP message is received by group chat, the conference server 11 sends a XMPP message to the client terminals 13 of all users entering the conference room of the group chat. The client terminal 13 reads the XMPP message that has been received, and updates the screen display as described below according to the XMPP message.

FIG. 12 illustrates an example of a XMPP message. In FIG. 12, as examples of a XMPP message, data formats of a display page specifying message, a figure adding message, a figure deleting message, and a handwritten memorandum update message are illustrated.

Group chat in XMPP is performed in units of conference rooms (rooms). When a XMPP message is sent by group chat, as indicated below, groupchat is specified as the type attribute of the message tag. Furthermore, as the from attribute, the sender is specified. As the to attribute, the conference room is specified. As the body attribute, contents of the message are specified.

```
<message from="alice@wonderland.lit/rabithole"
    to="teaparty@conference.wonderland.lit"
    type="groupchat">
  <body>March Hare: There's PLENTY of rooms!</body>
</message>
```

The message tag is a standardized specification, and therefore detailed descriptions are omitted.

In the conference system 1 according to the present embodiment, in order to synchronize the displaying of the display page of the conference material, a figure, and a handwritten memorandum among the client terminals 13, XML data defined in the conference system 1 is embedded in the body tag of the XMPP message.

In the XML data, a conference tag is used as the route element, and as an operation attribute for adding additional information to the route element, values such as update, add, and delete are specified.

In a display page specifying message, the display page is specified by a page tag so that the display page is shared among the client terminals 13, in a case where the material used in the conference (conference material) is constituted by a plurality of pages.

Furthermore, in the figure adding message, the figure data is specified by an autoshape tag so that the figure added by a certain client terminal 13 is shared among the client terminals 13. As the id attribute of the autoshape tag, an identifier of a figure is indicated. As the x and y attributes, the top left position of the figure (for example, coordinates) is indicated. Inside the autoshape tag, the figure is defined with the use of SVG (Scalable Vector Graphics) data.

SVG is a vector graphic language described in XML, and is recommended as an open standard in W3C (World Wide Web Consortium). When adding a new figure, the value of the operation attribute is specified by add, and a figure is defined by an autoshape tag and SVG data. The following is an example of SVG data.

```
<svg width="5cm" height="4cm" version="1.1"
    xmlns="http://www.w3.org/2000/svg">
  <desc>Four separate rectangles</desc>
    <rect x="0.5cm" y="0.5cm" width="2cm" height="1cm"/>
    <rect x="0.5cm" y="2cm" width="1cm" height="1.5cm"/>
    <rect x="3cm" y="0.5cm" width="1.5cm" height="2cm"/>
    <rect x="3.5cm" y="3cm" width="1cm" height="0.5cm"/>
    <rect x=".01cm" y=".01cm" width="4.98cm" height="3.98cm"
        fill="none" stroke="blue" stroke-width=".02cm" />
</svg>
```

Furthermore, the figure deleting message is for deleting a figure. The value of the operation attribute is specified by delete, and the autoshape tag of the object of deletion is specified. In this case, the object of deletion is determined by the id attribute of the autoshape tag.

Furthermore, in the handwritten memorandum update message, the handwritten memorandum data is specified by an ink tag, so that the handwritten memorandum added by a certain client terminal 13 is shared among the client terminals 13. As to the ink tag, a format defined by InkML is used. InkML is for describing handwritten data by XML data, and a recommended specification is recommended by W3C. The following is an example of InkML data.

```
<ink xmlns="http://www.w3.org/2003/InkML"
    documentID="abcdefg123">
  <definitions>
    <brush xml:id="br1">
      <brushProperty name="color" value="#000000"/>
      <brushProperty name="width" value="6" units="dev"/>
    </brush>
    <brush xml:id="br2">
      <brushProperty name="color" value="#FF0000"/>
      <brushProperty name="width" value="20" units="dev"/>
    </brush>
  </definitions>
  <trace brushRef="#br1" xml:id="tr1">90 89, 91 90, 93 95, 97 101, 103 110, 111 120, 119 129</trace>
  <trace brushRef="#br2" xml:id="tr2">234 365, 236 363, 239 359, 242 357, 245 354, 249 351</trace>
</ink>
```

It is assumed that the handwritten memorandum in the conference material is expressed by a single InkML data item. When updating the handwritten memorandum, the value of the operation attribute is specified by update.

Overview of First Embodiment

In the conference system 1, when creating a conference, a "password" and "authorization to download the conference material" can bet set. In the conference system 1, anyone who knows the password can attend the conference. Therefore, in the conference system 1, there is no need to register information used for user authentication in advance, and therefore the conference system 1 can be used for conferences for which the attending users are not determined in advance.

Furthermore, in the conference system 1, when it is set not to authorize the downloading of the conference material, the downloading of the conference material is not authorized at times other than during the conference. In the conference system 1, when it is set to authorize the downloading of the conference material, anyone who knows the password can download the conference material even at times other than during the conference.

By the above mechanism, in the conference system 1, for example, by telling the password to users who have accessed the conference information when they make the access, it is possible to let the users who have accessed the conference information attend the conference. There is no need to register in advance any information used for user authentication, and the password for attending the conference is used. Therefore, the conference system 1 can be used for conferences for which attending users are not determined in advance, and security is ensured.

Furthermore, in the conference system 1, it is possible make a setting not to authorize the downloading of the conference material at times other than during the conference. Furthermore, even when a setting is made to authorize the downloading of the conference material at times other than during the conference, the downloading of the conference material is unauthorized unless the user knows the password. Therefore, the conference material is prevented from being leaked. Note that in the conference system 1 during the conference, the downloading of the conference material is authorized if the user knows the password.

According to the present embodiment, the conference system 1 can be used for conferences for which the attending users are not determined in advance, and the conference material is prevented from being leaked.

Second Embodiment

In the conference system 1 according to the first embodiment, the client terminal 13 is not caused to discard the downloaded conference material, and therefore it is not possible to prevent the conference material from being saved at the client terminal 13. Thus, a second embodiment provides a mechanism for preventing the conference material from being saved, i.e., for requiring time-consuming work for saving the conference material. Descriptions are omitted for the same parts as those of the first embodiment.

FIG. 13 illustrates a configuration of an example of a conference system 1A using XMPP according to another embodiment. The conference system 1A in FIG. 13 is constituted by adding a data conversion service 14 to the conference system 1 of FIG. 3. For example, the data conversion service 14 may be realized by a server, or may be realized as a function of the web server 10 and the conference server 11. For example, when the conference material is in a PDF format, the data conversion service 14 converts an arbitrary page (display page) into image data.

During the conference, the web server 10 sends, to the client terminal 13, the image data of the display page that has been converted by the data conversion service 14. Accordingly, the client terminal 13 can only save the conference material in units of display pages. Furthermore, the user needs to perform the saving operation in units of display pages, which is significantly time-consuming.

Overview of Second Embodiment

According to the second embodiment, it is time-consuming to save the conference material, and therefore it is possible to prevent the conference material from being saved at the client terminal 13. As a result, according to the conference system 1A according to the second embodiment, the conference material is prevented from being leaked.

The information processing device and the conference system are not limited to the specific embodiments described herein, and variations and modifications may be made without departing from the scope of the present invention. For example, a content acquisition request receiving unit corresponds to the conference material acquisition request receiving unit 33. A content provision allowance determining unit corresponds to the conference material provision allowance determining unit 35. A content providing unit corresponds to the conference material providing unit 36.

In the present embodiment, the web server 10 includes the conference material acquisition request receiving unit 33, the conference material provision allowance determining unit 35, and the conference material providing unit 36; however, the conference server 11 may include these elements.

The conference system 1 including the web server 10, the conference server 11, and the database server 12 is one example; it is needless to say that various system configuration examples are applicable according to the purpose and object.

According to one embodiment of the present invention, leakage of contents can be mitigated.

The present application is based on and claims the benefit of priority of Japanese Priority Patent Application No. 2012-201145, filed on Sep. 13, 2012 and Japanese Priority Patent Application No. 2013-103037, filed on May 15, 2013, the entire contents of which are hereby incorporated herein by reference.

What is claimed is:

1. An information processing system connected to a plurality of client terminals through a network, the information processing system comprising:
a web server connected to the plurality of client terminals through the network and configured to communicate with the client terminals using Hypertext Transfer Protocol (HTTP);
a first memory contained in the web server and configured to store a first program including one or more instructions;
a conference server connected to the plurality of client terminals through the network and configured to communicate with the plurality of client terminals using an extensible messaging and presence protocol;
a second memory contained in the conference server and configured to store a program including one or more instructions;
at least one first processor contained in the web server and at least one second processor contained in the conference server that are configured to cause the web server and the conference server to perform, by reading the first and second programs stored in the first and second memories, respectively, the following steps, in cooperation with each other, of:
receiving a first request message to create a conference, by the conference server, from at least one of the plurality of client terminals using the extensible messaging and presence protocol, the first request message including first information indicating authorization or unauthorization for downloading conference material data and a first password;

creating identification information of the conference upon receiving the first request message by the conference server;

storing the identification information of the conference in a database, by the conference server, and associating the identification information of the conference stored in the database with a conference status that is a before the conference status, the first information indicating authorization for downloading conference material data, the first password, and second information containing a conference material data;

sending the identification information of the conference stored in the database to the plurality of client terminals by the conference server using the extensible messaging and presence protocol;

changing the conference status associated with the identification information of the conference from the before the conference status to a during the conference status by the conference server upon receiving a second request message to open the conference from at least one of the plurality of client terminals, the second request message received from the at least one of the plurality of client terminals containing the identification information of the conference and a second password that matches the first password stored in the database;

creating a conference room for group chat using the extensible messaging and presence protocol by the conference server, the conference room corresponding to the conference whose conference status is changed from the before the conference status to the during the conference status;

receiving a third request message to attend the conference indicating the during the conference status from at least one of the plurality of client terminals by the web server by way of the conference server;

allowing the at least one of the plurality of client terminals to attend the group chat of the created conference room by the conference server when a third password included in the third request message matches the first password stored in the database upon receiving the third request message;

sending, by the conference server, a message received from at least one of the plurality of client terminals attending the group chat by the extensible messaging and presence protocol, to the other client terminals attending the group chat to synchronize a display of the second information among the client terminals attending the group chat;

receiving a fourth request message to request the second information of the conference from at least one of the plurality of client terminals by the web server, the fourth request message including identification information of the conference, the fourth request message being an HTTP request;

determining, by the web server, by referring to the database, whether or not the conference status associated with the identification information included in the fourth request message indicates the during the conference status;

upon determining that the conference status indicates the during the conference status, sending the requested second information by the web server using the HTTP to the at least one of the plurality of client terminals from which the fourth request message has been sent when a fourth password included in the fourth request message matches the first password associated with the identification information of the requested conference stored in the database even if the first information indicating unauthorization for downloading conference material data;

upon determining that the conference status indicates the before the conference status or an after the conference status, sending the requested second information by the web server using the HTTP to the at least one of the plurality of client terminals from which the fourth request message has been sent, in referring to the database, when the first information indicating authorization for downloading conference material data, and when the fourth password included in the fourth request message matches the first password associated with the identification information of the requested conference stored in the database;

upon determining that the conference status indicates the before the conference status or the after the conference status, not sending the requested conference material by the web server to the at least one of the plurality of client terminals from which the fourth request message has been sent, in referring to the database, when the first information indicating unauthorization for downloading conference material data;

dividing the conference material into predetermined units; and providing the conference material, which has been divided into the predetermined units, to the at least one of the plurality of client terminals which is the source of the fourth request, when the result of the determination is that the requested conference material is allowed to be provided.

2. The information processing system according to claim 1, wherein
the password information is specified information set in an arbitrary field specified in a HTTP header.

3. The information processing system according to claim 1, wherein
the password information is specified information set in a User-Agent field in a HTTP header.

4. The information processing system according to claim 1, wherein the instant massaging protocol is XMPP (Extendable Messaging and Presence Protocol) or XMPP over BOSH (Bidirectional-streams Over Synchronous HTTP).

5. A non-transitory computer-readable recording medium storing a program that causes an information processing system including at least one processor that executes the program so as to execute a process comprising:

receiving a first request message to create a conference, from at least one of the plurality of client terminals, by a conference server using an extensible messaging and presence protocol, the first request message including first information indicating authorization or unauthorization for downloading conference material data and a first password;

creating identification information of the conference upon receiving the first request message by the conference server;

storing the identification information of the conference in a database, by the conference server, and associating the identification information of the conference stored in the database with a conference status that is a before the conference status, the first information indicating authorization for downloading conference material data, the first password, and second information containing a conference material data;

sending the identification information of the conference stored in the database to the plurality of client terminals by the conference server using the extensible messaging and presence protocol;

changing the conference status associated with the identification information of the conference from the before the conference status to a during the conference by the conference server upon receiving a second request message to open the conference from at least one of the plurality of client terminals, the second request message received from the at least one of the plurality of client terminals containing the identification information of the conference and a second password that matches the first password stored in the database;

creating a conference room for group chat using the extensible messaging and presence protocol by the conference server, the conference room corresponding to the conference whose conference status is changed from the before the conference status to the during the conference status;

receiving a third request message to attend the conference indicating the during the conference status from at least one of the plurality of client terminals by a web server by way of the conference server;

allowing the at least one of the plurality of client terminals to attend the group chat of the created conference room by the conference server when a third password included in the third request message matches the first password stored in the database upon receiving the third request message;

sending, by the conference server, a message received from at least one of the plurality of client terminals attending the group chat by the extensible messaging and presence protocol, to the other client terminals attending the group chat to synchronize a display of the second information among the client terminals attending the group chat;

receiving a fourth request message to request the second information of the conference from at least one of the plurality of client terminals by the web server, the fourth request message including identification information of the conference, the fourth request message being a Hypertext Transfer Protocol (HTTP) request;

determining, by referring to the database, whether or not the conference status associated with the identification information included in the fourth request message indicates the during the conference status by the web server;

upon determining that the conference status indicates the during the conference status, sending the requested second information by the web server using HTTP to the at least one of the plurality of client terminals from which fourth request message has been sent when a fourth password included in the fourth request message matches the first password associate with the identification information of the requested conference stored in the database even if the first information indicating unauthorization for downloading conference material data;

upon determining that the conference status indicates the before the conference status or an after the conference status, sending the requested second information by the web server using the HTTP to the at least one of the plurality of client terminals from which the fourth request message has been sent, in referring to the database, when the first information indicating authorization for downloading conference material data, and when the fourth password included in the fourth request message matches the first password associated with the identification information of the requested conference stored in the database;

upon determining that the conference status indicates the before the conference status or the after the conference status, not sending the requested conference material by the web server to the at least one of the plurality of client terminals from which the fourth request message has been sent, in referring to the database, when the first information indicating unauthorization for downloading conference material data;

dividing the conference material into predetermined units; and providing the conference material, which has been divided into the predetermined units, to the at least one of the plurality of client terminals which is the source of the fourth request, when the result of the determination is that the requested conference material is allowed to be provided.

6. A conference system comprising:

a plurality of client terminals attending a conference;

a web server connected to the plurality of client terminals through a network and configured to provide a conference material that is to be shared among the plurality of client terminals using Hypertext Transfer Protocol (HTTP);

a first memory contained in the web server and storing a first program including one or more instructions;

a conference server connected to the plurality of client terminals through the network and configured to communicate with the plurality of client terminals using an extensible messaging and presence protocol;

a second memory contained in the conference server and storing a second program including one or more instructions;

at least one first processor provided in the web server and at least one second processor provided in the conference server that are configured to execute the first and second programs, respectively, so as to cause the web server and the conference server to implement the following steps, in cooperation with each other, of:

receiving a first request message to create a conference, by the conference server, from at least one of the plurality of client terminals using the extensible messaging and presence protocol, the first request message including first information indicating authorization or unauthorization for downloading conference material data and a first password;

creating identification information of the conference upon receiving the first request message by the conference server;

storing the identification information of the conference in a database, by the conference server, and associating the identification information of the conference stored in the database with a conference status that is a before the conference status, the first information indicating authorization for downloading conference material data, the first password, and second information containing a conference material data;

sending the identification information of the conference stored in the database to the plurality of client terminals by the conference server using the extensible messaging and presence protocol;

changing the conference status associated with the identification information of the conference from the before the conference status to a during the conference status by the conference server upon receiving a second request to open the conference from at least one of the plurality of client terminals, the second request message received from the at least one of the plurality of client terminals containing the identification information of the conference and a second password that matches the first password stored in the database;

creating a conference room for group chat using the extensible messaging and presence protocol by the conference server, the conference room corresponding to the conference whose conference status is changed from the before the conference status to the during the conference status;

receiving a third request message to attend the conference indicating the during the conference status from at least one of the plurality of client terminals by the web server by way of the conference server;

allowing the at least one of the plurality of client terminals to attend the group chat of the created conference room by the conference server when a third password included in the third request message matches the first password stored in the database upon receiving the third request message;

sending, by the conference server, a message received from at least one of the plurality of client terminals attending the group chat by the extensible messaging and presence protocol, to the other client terminals attending the group chat to synchronize a display of the second information among the client terminals attending the group chat;

receiving a fourth request message to request the second information of the conference from at least one of the plurality of client terminals by the web server, the fourth request message including identification information of the conference, the fourth request message being an HTTP request;

determining, by referring to the database, whether or not the conference status associated with the identification information included in the fourth request message indicates the during the conference status by the web server;

upon determining that the conference status indicates the during the conference status, sending the requested second information by the web server using HTTP to the at least one of the plurality of client terminals from which the fourth request message has been sent when a fourth password included in the fourth request message matches the first password associate with the identification information of the requested conference stored in the database even if the first information indicating unauthorization for downloading conference material data;

upon determining that the conference status indicates the before the conference status or an after the conference status, sending the requested second information by the web server using the HTTP to the at least one of the plurality of client terminals from which the fourth request message has been sent, in referring to the database, when the first information indicating authorization for downloading conference material data, and when the fourth password included in the fourth request message matches the first password associated with the identification information of the requested conference stored in the database;

upon determining that the conference status indicates the before the conference status or the afeter the conference status, not sending the requested conference material by the web server to the at least one of the plurality of client terminals from which the fourth request message has been sent, in referring to the database, when the first information indicating unauthorization for downloading conference material data;

dividing the conference material into predetermined units; and providing the conference material, which has been divided into the predetermined units, to the at least one of the plurality of client terminals which is the source of the fourth request, when the result of the determination is that the requested conference material is allowed to be provided.

7. An information processing method using an information processing system including at least one processor that executes a program, the method comprising steps of:

receiving a first request message to create a conference, from at least one of the plurality of client terminals, by a conference server using an extensible messaging and presence protocol, the first request message including first information indicating authorization or unauthorization for downloading conference material data and a first password;

creating identification information of the conference upon receiving the first request message by the conference server;

storing the identification information of the conference in a database, by the conference server, and associating the identification information of the conference stored in the database with a conference status that is a before the conference status, the first information indicating authorization for downloading conference material data, the first password, and second information containing a conference material data;

sending the identification information of the conference stored in the database to the plurality of client terminals by the conference server using the extensible messaging and presence protocol;

changing the conference status associated with the identification information of the conference from the before the conference status to a during the conference status by the conference server upon receiving a second request message to open the conference from at least one of the plurality of client terminals, the second request message received from the at least one of the plurality of client terminals containing the identification information of the conference and a second password that matches the first password stored in the database;

creating a conference room for group chat using the extensible messaging and presence protocol by the conference server, the conference room corresponding to the conference whose conference status is changed from the before the conference status to the during the conference status;

receiving a third request message to attend the conference indicating the during the conference status from at least one of the plurality of client terminals by a web server by way of the conference server;

allowing the at least one of the plurality of client terminals to attend the group chat of the created conference room by the conference server when a third password information included in the third request message matches the first password stored in the database upon receiving the third request message;

sending, by the conference server, a message received from at least one of the plurality of client terminals attending the group chat by the extensible messaging and presence protocol, to the other client terminals attending the group chat to synchronize a display of the second information among the client terminals attending the group chat;

receiving a fourth request message to request the second information of the conference from at least one of the plurality of client terminals by the web server, the fourth request message including identification information of the conference, the fourth request message being an HTTP request;

determining, by referring to the database, whether or not the conference status associated with the identification information included in the fourth request message indicates the during the conference status by the web server;

upon determining that the conference status indicates the during the conference status, sending the requested second information by the web server using the HTTP to the at least one of the plurality of client terminals from which the fourth request message has been sent when a fourth password included in the fourth request message matches the first password associate with the identification information of the requested conference stored in the database even if the first information indicating unauthorization for downloading conference material data;

upon determining that the conference status indicates the before the conference status or an after the conference status, sending the requested second information by the web server using the HTTP to the at least one of the plurality of client terminals from which the fourth request message has been sent, in referring to the database, when the first information indicating authorization for downloading conference material data, and when the fourth password information included in the fourth request message matches the first password associated with the identification information of the requested conference stored in the database;

upon determining that the conference status indicates the before the conference status or the after the conference status, not sending the requested conference material by the web server to the at least one of the plurality of client terminals from which the fourth request message has been sent, in referring to the database, when the first information indicating unauthorization for downloading conference material data;

dividing the conference material into predetermined units; and providing the conference material, which has been divided into the predetermined units, to the at least one of the plurality of client terminals which is the source of the fourth request, when the result of the determination is that the requested conference material is allowed to be provided.

* * * * *